Sept. 25, 1956 A. FORD ET AL Re. 24,223
ACCUMULATOR
Original Filed July 11, 1952
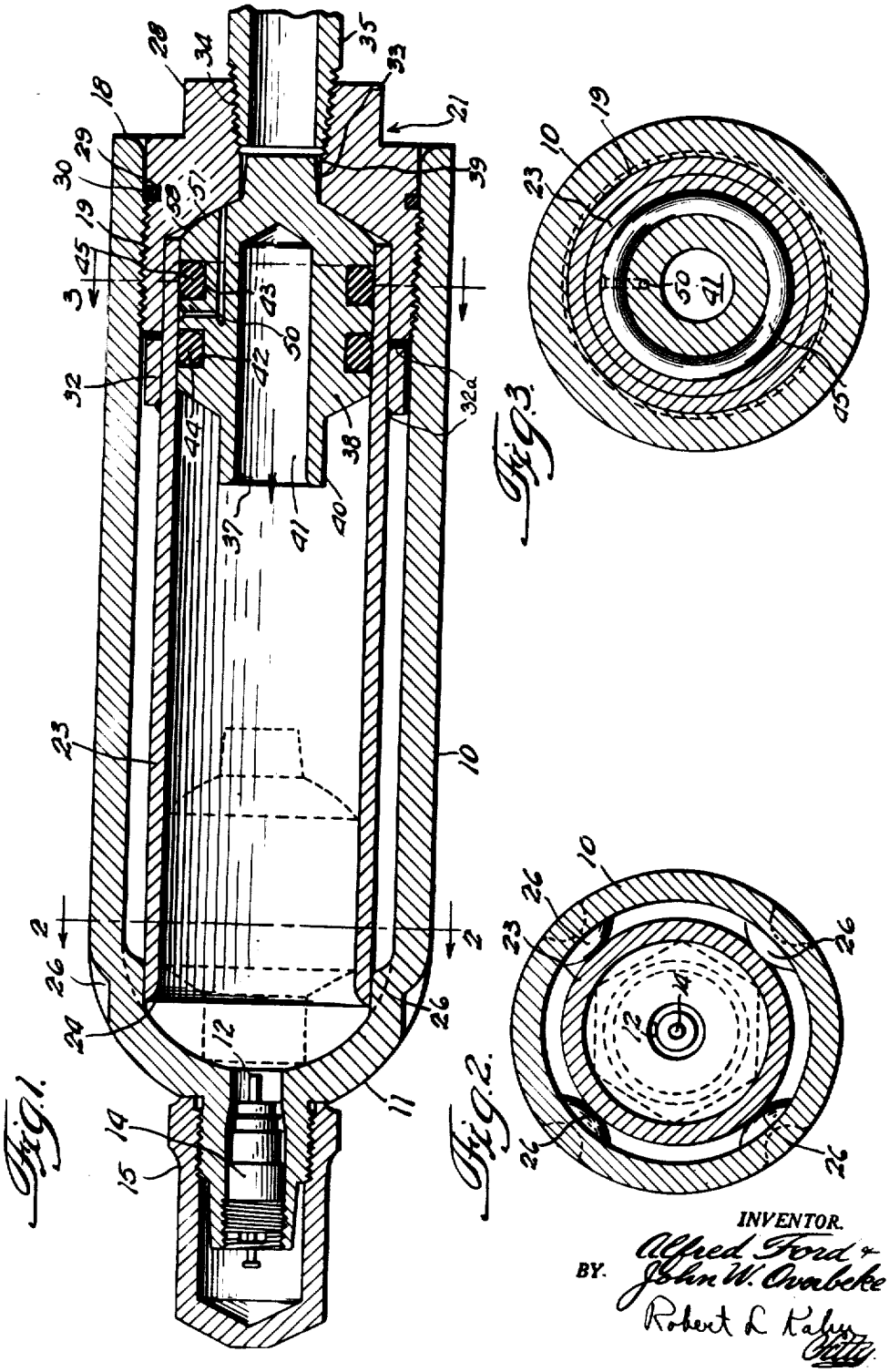
INVENTOR.
BY. Alfred Ford &
John W. Overbeke
Robert L. Kahn
Atty.

United States Patent Office

Re. 24,223
Reissued Sept. 25, 1956

24,223

ACCUMULATOR

Alfred Ford, Chicago, Ill., and John W. Overbeke, Cleveland, Ohio, assignors to Superior Pipe Specialties Co., a corporation of Illinois Original No. 2,715,419, dated August 16, 1955, Serial No. 298,410, July 11, 1952. Application for reissue April 27, 1956, Serial No. 581,815

11 Claims. (Cl. 138—31)

Matter enclosed in heavy brackets [ ] appears in the original patent but forms no part of this reissue specification; matter printed in italics indicates the additions made by reissue.

This invention relates to an accumulator for storing mechanical energy. Accumulators of this type have a wide variety of applications which range from shock absorbers to storing potential energy to be discharged as kinetic energy. Thus as an example, accumulators may be used in connection with turning a heavy internal combustion engine for starting the same under adverse conditions of cold or the like.

Accumulators must be constructed to withstand considerable pressure, while being mechanically simple and having a minimum amount of parts. This invention makes it possible to make an accumulator having valuable features which render the same desirable from the point of view of manufacture and assembly and use.

Thus an important feature in the construction to be described makes it possible for the movable element of the accumulator to move to the end of its discharge stroke without danger of mechanical shock. In many such devices, a movable piston on reaching the end of its discharge stroke may strike the stationary part of the accumulator with sufficient force to cause knocking and serious damage. A construction embodying the present invention endows the accumulator with piston-retarding means which is only operative at the end of its discharge stroke. The piston-retarding means comprises simple features of construction which in no way render the accumulator any more expensive or difficult to manufacture or build.

The accumulator to which this invention pertains is of the type having an elongated outer casing within which is a sleeve. Within this sleeve is a floating piston. Suitable hydraulic pressure, such as from oil, for example, is applied to one side of the piston. On the other side of the piston and within the casing structure as a whole is a quantity of compressible gas. As the piston moves under hydraulic pressure, the gas is compressed. The gas is inside and outside of the sleeve.

By suitable design of the thickness and dimensions of the sleeve as well as the outer casing, the capacity of the accumulator may be varied. Thus accumulators of this type may have a length of from several inches up to as much as three feet or more. A feature of the present invention resides in the construction of the outer casing whereby centering of the sleeve within the outer casing is accomplished. This feature is of substantial importance in accumulators having substantial length.

As is well known, the operating characteristic of an accumulator is determined in a substantial degree by the compression ratio and by the variation of compression with piston movement. An important feature of the present invention makes it possible to provide accumulators having the same basic structure with different desired characteristics. Thus in the new accumulator, the construction is such that the outer casing and casing plug remain the same for all types. The plug construction makes it possible to use different kinds of sleeves and pistons to obtain desired characteristics.

Thus with the same basic structure, accumulators having various operating characteristics or having different combinations of outer casing and inner sleeve may be obtained.

An accumulator embodying the present invention has features which make it possible to use a compartively short piston. Thus, in conventional accumulators, a piston reaching the end of its stroke, irrespective whether it is charging or discharging, may be cocked and bind. It has been customary to provide long pistons to avoid this. In our new accumulator, it is possible to use a short piston and yet avoid binding at either end of the piston travel range.

Other features whose value will be apparent to and appreciated by those skilled in the art, will be obvious in connection with a description of the invention.

Referring to the drawings, an exemplary embodiment of the invention is shown, it being understood that modifications may be made without departing from the spirit of the invention.

Figure 1 is a longitudinal median section of an accumulator embodying the present invention, the piston being shown in its extreme discharged condition and the dotted lines showing the piston in a charged accumulator position;

Figure 2 is a section along line 2—2 of Figure 1;

Figure 3 is a section along line 3—3 of Figure 1.

The accumulator comprises generally cylindrical outer casing 10, having rounded bottom 11 with filling end 12. Casing 10 is of suitable material and, in practice, will be of drawn or forged steel having suitably heavy walls to withstand the pressure.

Filling end 12 is threaded internally to receive valve 14 and is externally threaded to receive cap 15. The filling channel may thus be conducted to suitable pipes for the introduction of air or gas under high pressure at an appropriate time. Under normal use, this end of the accumulator is sealed.

Outer casing 10 has open end 18. The interior of the outer casing is threaded at 19 at a region near end 18. Disposed within the outer casing is a sleeve assembly, generally indicated by numeral 21. This sleeve assembly comprises sleeve member 23 having free end 24. In order to center end 24 within outer casing 10, a number of indentations 26 are formed in the wall of the outer casing near the closed end of the casing to engage the outer surface of end 24 of the sleeve. As is evident in Figure 2, indentations 26 are disposed circularly along the wall of casing 10. As little as three indentations may be used. The indentations are formed so that the free end of the sleeve is snugly retained and centered. Any inwardly (from the inside surface of outer casing 10) directed fingers or bosses may be used instead of indentations. In the latter case, finishing of the bosses would be advisable for accurate centering.

Sleeve 23 is separate from, but permanently attached, to plug portion 28. Plug portion 28 is threaded to cooperate with threaded portion 19 of the outer casing. Plug portion 28 is provided with annular sealing recess 29 into which gasket 30 may be disposed. As is clear from Figure 1, recess 29 and gasket 30 are disposed at an intermediate portion of plug 28 so that the gasket is forced inwardly within the end portion of outer casing 10. Over sleeve 23 is annular portion 32. This is welded or soldered at 32a to the plug portion and sleeve to provide a gas tight pressure seal.

It will be noted that sleeve 23 is separate from the plug. Thus a sleeve having a different wall thickness or even a tapered wall may be used while retaining a constant inner diameter. As long as the outside diameter of the two ends of the sleeve remains constant, the same plug and outer casing may be used in a complete line of accumulators having different capacities of characteristics.

Plug portion 28 is provided with an axial channel 33, one part of which is tapped at 34. The tapped portion has pipe threads and is adapted to have a nipple or pipe 35 disposed therein. Thus this end of the accumulator casing has a restricted opening.

Freely movable longitudinally within sleeve 23 is floating piston assembly generally indicated by numeral 37. This piston assembly comprises body 38 having front or outer projecting portion 39 and rear or inner projecting portion 40. It will be observed that the floating piston has an axial internal chamber 41.

Piston body 38 is provided with piston ring channels 42 and 43. These channels are annular and may have any desired cross section. As a rule, the piston ring channels are rectangular having suitable dimensions. Lying within the piston ring channels are packing rings 44 and 45. These rings are of suitable flexible material and may be of a material such as neoprene or Buna S rubber, or other material having desired physical characteristics.

The piston has pressure balancing passages 50 which extend from the outside of the piston body to the outer face 51 of the piston. The outer face 51 of the piston has a domed-convex shape. The corresponding surface 58 of plug 28 has a surface of such shape that the two opposing surfaces (in the fully discharged position) will meet along a circle. The line contact will reduce any tendency to cock the piston and bind.

Plug bore or channel 33 is preferably machined or accurately finished. Piston projecting portion 39 is so shaped that as the piston moves to a discharged position, throttling of the exit region into the plug bore will result. Thus as shown, the projecting portion may be tapered. Generally longitudinal cuts or grooves along the surface may be provided, if desired, instead of tapering surfaces. These cuts or grooves may be on the inside surface of bore 33 or the opposed outside surface of projection 39 or both. It is not essential that piston projection 39 provide a seal at the plug when the piston is at the end of its travel.

The throttling should be symmetrical circularly of projection 39 so that the reaction on the piston will be along the piston axis. Thus cocking of the piston during throttling will be eliminated.

Rear projecting portion 40 is shaped relative to the inner surface of outer casing 10 so that a substantial line contact between piston and casing occurs in the fully charged position. Thus binding in the fully charged position will be minimized. Instead of line contact, a more extended contact area may be used.

The operation of the accumulator is as follows: It is assumed that a suitable gas is introduced at end 12 with the piston in the position shown in Figure 1. In this position, the gas pressure is at a minimum and may be as desired depending upon the requirements of the accumulator. Now liquid under suitable pressure is introduced through nipple 35 against the front or outer side of the piston. Assuming that the liquid has sufficient pressure, the piston will be moved to compress the gas to an equal pressure. Since the gas can pass from the region within sleeve 23 in the rear of the piston to the annular region around sleeve 23 by way of end 24 of the sleeve, it is clear that a high pneumatic pressure will be developed within and outside of sleeve 23.

Gasket 30 which may be of suitable material, such as neoprene, together with the cooperating threaded parts on the plug and outer casing serve to seal the air from leaking to the outside. The piston rings perform their usual functions of sealing or holding against pressure and maintaining the piston in full floating condition. Pressure-balancng passage 50 is provided for the purpose of maintaining the same pressure between the piston ring and the front of the piston. In the arrangement shown, gasket 42 will hold the pressure, while gasket 43 functions to prevent the piston body from touching the cylinder wall.

When potential energy, stored in the accumulator, is to be used, a suitable load is connected to nipple 35. It is understood that suitable valves and the like are provided for controlling the discharge of energy from the accumulator. As pointed out before, with the floating piston moving to the right, as seen in Figure 1 in energy discharge direction, there has been a tendency for the piston to strike the plug end with considerable force. By virtue of the construction shown, the fluid discharge in front of the floating piston is throttled near the end of the discharge stroke. Thus the last bit of piston travel will be cushioned because of throttling and the piston will reach the end of its discharge stroke with substantially no shock.

What we claim is:

1. An accumulator comprising an outer cylinder having one end open and the other end sealed, a plug having a bore providing a restricted discharge opening for the open end of the outer cylinder, a sleeve carried by said plug in said outer cylinder and extending to the sealed end of the outer cylinder, a floating piston within said sleeve movable along the cylinder axis toward the [sealed end] *plug* for energy discharging, a finger projecting axially from the piston and extending toward the plug, said projecting finger being adapted to enter the bore, *one of* the opposed surfaces of bore and finger *being cylindrical and the other of the opposed surfaces being non-cylindrical for* providing an annular fluid discharge region of increasing fluid-flow resistance with final piston travel toward a fully discharged position.

2. The structure according to claim 1, wherein means are provided at the sealed end of the outer casing for centering the free end of the sleeve.

3. The accumulator according to claim 1 wherein the piston has a dome shaped face where the finger projects and wherein he plug has the surface facing said dome shaped piston part shaped so that a substantially circular line contact between the piston and plug surfaces occurs when the piston is in the fully discharged position.

4. The construction according to claim 3 wherein said piston has an elongated body with an axial recess extending from the face of the piston remote from the finger.

5. The accumulator according to claim 4 wherein said piston has a pair of annular slots with piston sealing rings disposed therein and wherein said piston has a pressure equalizing channel extending from the dome shaped face of the piston to the surface of the piston between the two piston rings.

6. An accumulator comprising a cylinder having one end open and the other end closed, a plug cooperating with said open cylinder end [for closing the same] said plug having an axial bore therethrough for providing a passageway connecting the interior of the cylinder with the exterior, a floating piston within said cylinder, said piston being movable along the cylinder axis toward and away from the plug for energy discharge and energy charge respectively, said piston having a dome-shaped end provided with a finger projecting axially from the end for cooperation with the bore of the plug, said finger being adapted to enter the plug bore when the piston is near the end of its discharge travel, said plug having a concave surface facing the dome-shaped part of the piston, the dome-shaped part of the piston having a sharper curvature than the opposed plug concave surface so that the dome-shaped piston end meets the concave plug surface substantially along a circle lying in a plane substantially perpendicular to the axis of the cylinder whereby as the piston reaches its full end position corresponding to discharge the piston will be guided toward a final resting position having a substantial line contact and thus prevent cocking and binding of the piston.

7. The construction according to claim 6 wherein the finger projecting from the piston is tapered, the smallest part of the finger being at the tip.

8. The construction according to claim 7 wherein said piston has a pair of annular slots with piston sealing rings disposed therein and wherein said piston has a pressure equalizing channel extending from the dome-shaped face of the piston to the surface of the piston between the two piston rings.

9. An accumulator comprising a cylinder having one end open and the other end closed, a plug cooperating with said open cylinder end [for closing the same] said plug having an axial bore therethrough for providing a passageway connecting the interior of the cylinder with the exterior, a floating piston within said cylinder, said piston being movable along the cylinder axis toward and away from the plug for energy discharge and energy charge respectively, said piston having a dome-shaped end provided with a finger projecting axially from the end for cooperation with the bore of the plug, said finger being adapted to enter the plug bore when the piston is near the end of its discharge travel, said piston having a pair of annular slots with piston sealing rings disposed therein and having a pressure equalizing channel extending from the dome-shaped face of the piston to the surface of the piston between the two piston rings, said plug having a concave surface facing the dome-shaped part of the piston, the dome-shaped part of the piston having a sharper curvature than the opposed plug concave surface so that the dome-shaped piston end meets the concave plug surface substantially along a circle lying in a plane substantially perpendicular to the axis of the cylinder whereby as the piston reaches its full end position corresponding to discharge, the piston will be guided toward a final resting position having a substantial line contact and thus prevent cocking and binding of the piston.

*10. An accumulator comprising an outer cylinder, means closing one end of said outer cylinder, means at the other end of the cylinder including a plug having a bore providing a restricted discharge opening for said other end of the outer cylinder, a sleeve coaxial with said outer cylinder and substantially axially coextensive therewith, a piston within said sleeve movable along the cylinder axis toward the plug for energy discharging, a finger projecting axially from the piston and extending toward the plug, said projecting finger being adapted to enter the bore, one of the opposed surfaces of bore and finger being tapered to lie in non-parallel relation to the other surface for providing an annular fluid discharge region of increasing fluid flow resistance with final piston travel toward a fully discharged position.*

*11. In an accumulator, means enclosing an interior fluid pressure chamber and including a cylinder and a plug at one end of said cylinder, a piston disposed in said cylinder for axial movement therein toward the plug for energy discharging, a finger on said piston extending toward said plug, and said plug having a bore providing a discharge opening for said chamber and adapted to receive said finger therein, adjacent surfaces of said bore and said piston finger being non-parallel to define therebetween a fluid discharge region of increasing fluid flow resistance to final piston travel to a fully discharged position.*

References Cited in the file of this patent or the original patent

UNITED STATES PATENTS

| | | |
|---|---|---|
| 1,949,640 | Peters | May 22, 1934 |
| 2,406,197 | Christensen | Aug. 20, 1946 |
| 2,417,873 | Huber | Mar. 25, 1947 |
| 2,421,076 | Linton | May 27, 1947 |

UNITED STATES PATENT OFFICE

CERTIFICATE OF CORRECTION

Reissue No. 24,223 September 25, 1956

Alfred Ford et al.

It is hereby certified that error appears in the printed specification of the above numbered patent requiring correction and that the said Letters Patent should read as corrected below.

Column 2, line 37, for "conducted" read --connected--; column 3, line 4, for "capacities of" read --capacities or--; line 75, for "balancng" read --balancing--; column 4, line 41, for "he plug" read --the plug--.

Signed and sealed this 20th day of November 1956.

(SEAL)
Attest:

KARL H. AXLINE
Attesting Officer

ROBERT C. WATSON
Commissioner of Patents